(12) United States Patent
Xu et al.

(10) Patent No.: US 7,769,534 B1
(45) Date of Patent: Aug. 3, 2010

(54) ASYMMETRICAL OXYGEN SENSOR DIAGNOSTIC AND DEGRADATION COMPENSATION SYSTEMS

(75) Inventors: Yong Xu, Ann Arbor, MI (US); Wenbo Wang, Novi, MI (US); Vincent A. White, Northville, MI (US); Richard H. Clutz, Howell, MI (US); Douglas J. Moening, Highland, MI (US)

(73) Assignee: GM Global Technology Operations, Inc. (US)

( * ) Notice: Subject to any disclaimer, the term of this patent is extended or adjusted under 35 U.S.C. 154(b) by 0 days.

(21) Appl. No.: 12/578,063

(22) Filed: Oct. 13, 2009

(51) Int. Cl.
  *F02D 41/14* (2006.01)
  *F02D 41/22* (2006.01)
(52) U.S. Cl. ............... 701/109; 701/114; 123/688; 73/114.73
(58) Field of Classification Search ......... 701/109, 701/114; 123/688; 73/114.73
  See application file for complete search history.

(56) References Cited

U.S. PATENT DOCUMENTS 5,065,728 A * 11/1991 Nakaniwa ............ 123/683
5,370,101 A * 12/1994 Hamburg et al. ........ 123/688
5,927,260 A * 7/1999 Kishimoto et al. ...... 123/688
6,286,493 B1 * 9/2001 Aoki ..................... 123/690
7,387,011 B2 * 6/2008 Fujiki et al. ............. 73/23.32
7,444,235 B2 10/2008 Anilovich et al.
7,499,789 B2 * 3/2009 Toda et al. ............. 701/109
7,574,905 B2 * 8/2009 Toya .................... 73/114.73
2003/0005746 A1 * 1/2003 Iwazaki et al. .......... 73/1.06

* cited by examiner

*Primary Examiner*—Erick Solis

(57) ABSTRACT

A diagnostic system for an engine includes an oxygen detection module, a timing module and a control module. The oxygen detection module receives an oxygen signal from an oxygen sensor that detects an oxygen level in an exhaust system of the engine. The oxygen signal has N rich states and M lean states, where N and M are integers greater than or equal to 1. The timing module determines a rich period that the oxygen signal is in at least one of the N rich states and determines a lean period that the oxygen signal is in at least one of the M lean states. The control module detects an asymmetrical error with the oxygen sensor based on a comparison between the rich period and the lean period.

18 Claims, 5 Drawing Sheets

ASYMMETRICAL OXYGEN SENSOR DIAGNOSTIC AND DEGRADATION COMPENSATION SYSTEMS

FIELD

The present application relates to vehicle diagnostic systems, and more particularly to passive oxygen sensor diagnostic and degradation compensation systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During the combustion process of an internal combustion engine (ICE), gasoline is oxidized and hydrogen (H) and carbon (C) combine with air to produce various chemical compounds. The chemical compounds may include, for example, carbon dioxide ($CO_2$), water ($H_2O$), carbon monoxide (CO), nitrogen oxides ($NO_X$), unburned hydrocarbons (HC), and sulfur oxides ($SO_X$).

Exhaust systems of an ICE may include a catalytic converter, a primary oxygen sensor and a secondary oxygen sensor. The catalytic converter reduces exhaust emissions by chemically converting an exhaust gas into carbon dioxide ($CO_2$), nitrogen (N), and water ($H_2O$). The primary and secondary oxygen sensors are used to detect oxygen content of the exhaust gas. The primary oxygen sensor monitors the oxygen level associated with exhaust gas entering the catalytic converter. The secondary oxygen sensor detects the oxygen level associated with exhaust gas exiting the catalytic converter. The primary and secondary oxygen sensors provide feedback signals that are used to maintain an air-to-fuel (A/F) ratio of the ICE at a chemically correct or stoichiometric A/F ratio to support catalytic conversion processes.

Exhaust diagnostic systems may monitor the catalytic converter and the primary and secondary oxygen sensors to ensure proper operation of engine and exhaust systems. Traditionally, passive tests and/or intrusive tests are implemented to check the operation of the primary and secondary oxygen sensors. During the intrusive tests, A/F ratios are intrusively adjusted and response of the primary and secondary sensors is monitored. Although the intrusive tests allow for error detection of the primary and secondary oxygen sensors, the intrusive tests can increase exhaust emissions and/or cause engine instability and reduce driveability.

SUMMARY

A diagnostic system for an engine is provided that includes an oxygen detection module, a timing module and a control module. The oxygen detection module receives an oxygen signal from an oxygen sensor that detects an oxygen level in an exhaust system of the engine. The oxygen signal has N rich states and M lean states, where N and M are integers greater than or equal to 1. The timing module determines a rich period that the oxygen signal is in at least one of the N rich states and determines a lean period that the oxygen signal is in at least one of the M lean states. The control module detects an asymmetrical error with the oxygen sensor based on a comparison between the rich period and the lean period.

In other features, a method of diagnosing an oxygen sensor is provided. The method includes receiving an oxygen signal from an oxygen sensor that detects an oxygen level in an exhaust system of an engine. The oxygen signal has N rich states and M lean states, where N and M are integers greater than or equal to 1. A rich period that the oxygen signal is in at least one of the N rich states is determined. A lean period that the oxygen signal is in at least one of the M lean states is determined. An asymmetrical error with the oxygen sensor is detected based on a comparison between the rich period and the lean period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
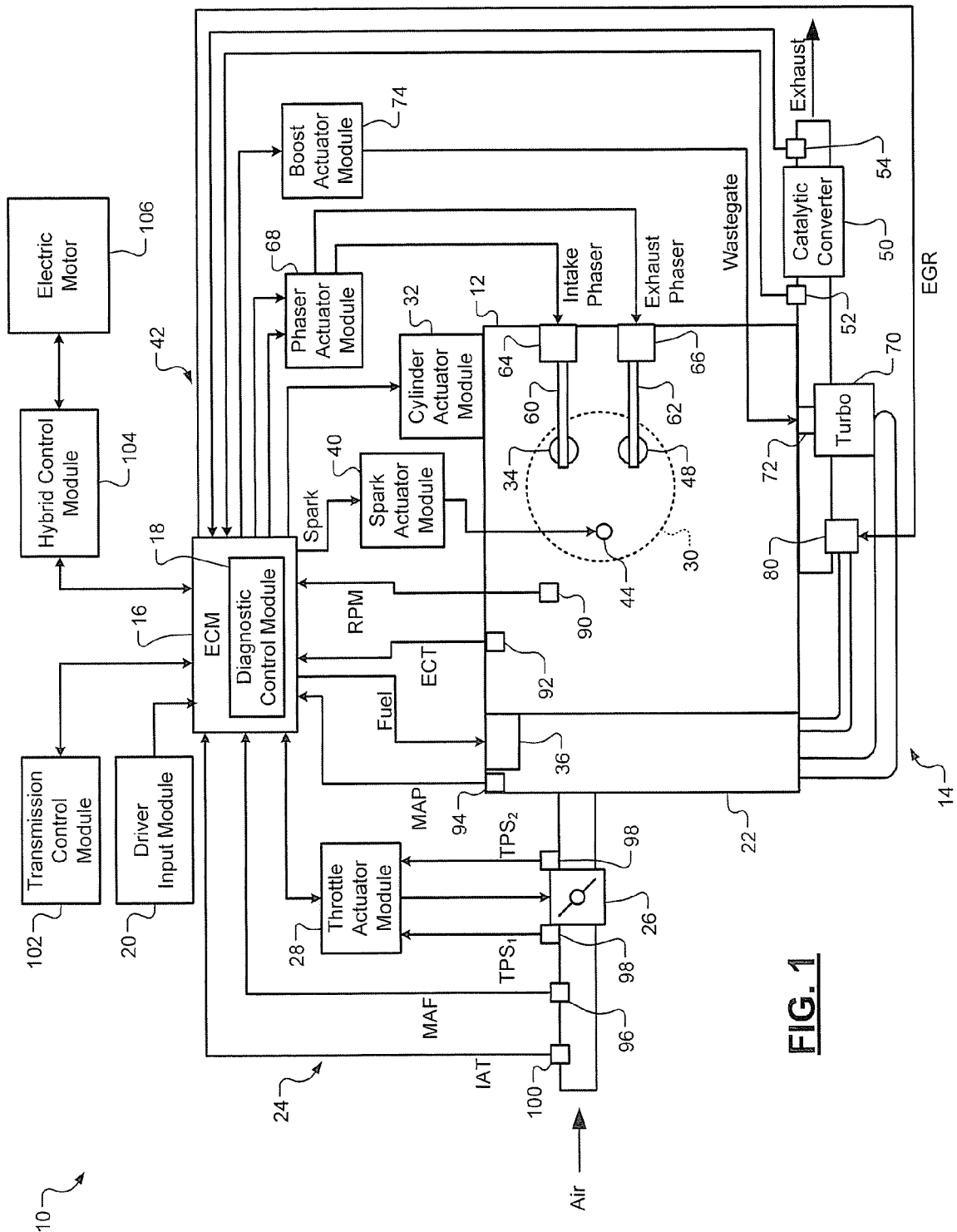
FIG. 1 is a functional block diagram of a portion of an engine control system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In FIG. 1, a first portion 10 of an engine control system is shown. The engine control system includes an engine 12, an exhaust system 14 and an engine control module (ECM) 16. The ECM 16 includes a diagnostic control module 18 that diagnoses errors and detects faults associated with components of the exhaust system 14.

An error may refer to, for example, a sensor signal that indicates improper operation with a corresponding sensor and/or with another component of an engine control system. An error may exist when a characteristic of the sensor signal exceeds a threshold. Sensor signal characteristics may include frequency, rich and lean state durations, amplitudes, etc. These sensor signal characteristics and others are described below.

A fault may refer to an identification of when a component is operating improperly. A component may not be faulty although an error is associated with the component. For example, a sensor signal generated by a sensor may indicate that an error is associated with that sensor. The error may be a FALSE indication of a fault with the sensor. The error may be generated due to a fault associated with other component(s).

As another example, an oxygen ($O_2$) sensor may generate an $O_2$ signal that indicates that the $O_2$ sensor is operating improperly. This may be a TRUE or FALSE indication of a fault with the $O_2$ sensor. The $O_2$ sensor may not be faulty (operating improperly), for example, when a catalytic converter or other $O_2$ sensor is faulty. This is described in further detail below.

The engine 12 combusts an air/fuel mixture to produce drive torque for a vehicle based on a driver input module 20. While a spark ignition, gasoline type engine is described herein, the present disclosure is applicable to other types of torque producers, not limited to gasoline type engines, diesel type engines, propane type engines, and hybrid type engines.

Air is drawn into an intake manifold 22 of a throttle control system 24 of the engine 12 through a throttle valve 26. The ECM 16 commands a throttle actuator module 28 to regulate opening of the throttle valve 26 to control the amount of air drawn into the intake manifold 22. Air from the intake manifold 22 is drawn into cylinders of the engine 12. While the engine 12 may include multiple cylinders, for illustration purposes, a single representative cylinder 30 is shown. The ECM 16 may instruct a cylinder actuator module 32 to selectively deactivate some of the cylinders to improve fuel economy.

Air from the intake manifold 22 is drawn into the cylinder 30 through an intake valve 34. The ECM 16 controls the amount of fuel injected by a fuel injection system 36. The fuel injection system 36 may inject fuel into the intake manifold 22 at a central location or may inject fuel into the intake manifold 22 at multiple locations, such as near the intake valve of each of the cylinders. Alternatively, the fuel injection system 36 may inject fuel directly into the cylinders.

The injected fuel mixes with the air and creates the air/fuel mixture in the cylinder 30. A piston (not shown) within the cylinder 30 compresses the air/fuel mixture. Based upon a signal from the ECM 16, a spark actuator module 40 of an ignition system 42 energizes a spark plug 44 in the cylinder 30, which ignites the air/fuel mixture. Spark timing may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 48. The byproducts of combustion are exhausted from the vehicle via the exhaust system 14.

The exhaust system 14 includes a catalytic converter 50, a pre-converter (primary) $O_2$ sensor 52, and a post-converter (secondary) $O_2$ sensor 54. The pre-converter $O_2$ sensor 52 is located upstream (with respect to the exhaust) of the catalytic converter 50 between the exhaust manifold and the catalytic converter. The post-converter $O_2$ sensor 54 is located downstream of the catalytic converter 50.

The catalytic converter 50 controls emissions by increasing the rate of oxidization of hydrocarbons (HC) and carbon monoxide (CO) and the rate of reduction of nitrogen oxides ($NO_X$). The $O_2$ storage/release capacity of the catalytic converter 50 is indicative of catalytic converter efficiency in oxidizing the HC and CO and catalytic converter ability in reducing $NO_X$.

The pre-converter $O_2$ sensor 52 communicates with the ECM 16 and measures the $O_2$ content of the exhaust stream entering the catalytic converter 50. The post-converter $O_2$ sensor 54 communicates with the ECM 16 and measures the $O_2$ content of the exhaust stream exiting the catalytic converter 50. The primary and secondary $O_2$ signals are indicative of $O_2$ levels in the exhaust system 14 before and after the catalytic converter 50. The $O_2$ sensors 52, 54 generate respective primary and secondary $O_2$ signals that are feedback to the ECM 16 for closed loop control of air/fuel ratio(s).

In one embodiment, the primary and secondary $O_2$ signals are weighted and a commanded air/fuel ratio is generated based, for example, 80% on the primary $O_2$ signal and 20% on the secondary $O_2$ signal. In another embodiment, the secondary $O_2$ signal is used to adjust a commanded air/fuel ratio that is generated based on the primary $O_2$ signal. The primary $O_2$ signal may be used for rough adjustment of an air/fuel ratio and the secondary $O_2$ signal may be used for fine adjustment of the air/fuel ratio. The ECM 16 adjusts fuel flow, throttle positioning, and spark timing based on the primary and secondary $O_2$ signals to regulate air/fuel ratio(s) in cylinders of the engine 12.

The diagnostic control module 18 monitors the primary and secondary $O_2$ signals and determines when there is an error and/or fault associated with the catalytic converter 50 and/or one or more of the $O_2$ sensors 52, 54. Performance diagnostics are performed on the $O_2$ sensors 52, 54 to determine whether the sensors are working properly. For example, the efficiency of catalytic converter monitoring may be decreased when one or more of the $O_2$ sensors 52, 54 is not functioning properly. The ECM 16 may compensate for the error(s) and/or fault(s) detected by the diagnostic control module 18. This compensation may be implemented when regulating the air/fuel ratio(s) of the engine 12.

The intake valve 34 may be controlled by an intake camshaft 60, while the exhaust valve 48 may be controlled by an exhaust camshaft 62. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 32 may deactivate cylinders by halting provision of fuel and/or spark and/or by disabling respective exhaust and/or intake valves.

The time at which the intake valve 34 is opened may be varied with respect to piston TDC by an intake cam phaser 64. The time at which the exhaust valve 48 is opened may be varied with respect to piston TDC by an exhaust cam phaser 66. A phaser actuator module 68 controls the phasers 64, 66 based on signals from the ECM 16.

The engine control system may include a boost device that provides pressurized air to the intake manifold 22. For example, FIG. 1 depicts a turbocharger 70. The turbocharger 70 is powered by exhaust gases flowing through the exhaust system 14, and provides a compressed air charge to the intake manifold 22. The air used to produce the compressed air charge may be taken from the intake manifold 22.

A wastegate 72 may allow exhaust gas to bypass the turbocharger 70, thereby reducing the turbocharger's output (or boost). The ECM 16 controls the turbocharger 70 via a boost actuator module 74. The boost actuator module 74 may modulate the boost of the turbocharger 70 by controlling the position of the wastegate 72. The compressed air charge is provided to the intake manifold 22 by the turbocharger 70. An intercooler (not shown) may dissipate some of the compressed air charge's heat, which is generated when air is compressed and may also be increased by proximity to the exhaust system 14. Alternate engine systems may include a supercharger that provides compressed air to the intake manifold 22 and is driven by the crankshaft.

The engine control system may include an exhaust gas recirculation (EGR) valve 80, which selectively redirects exhaust gas back to the intake manifold 22. In various implementations, the EGR valve 80 may be located after the turbocharger 70. The engine control system may measure the speed of the crankshaft in revolutions per minute (RPM) using an RPM sensor 90. The temperature of the engine coolant may be measured using an engine coolant temperature (ECT) sensor 92. The ECT sensor 92 may be located within the engine 12 or at other locations where the coolant is circulated, such as a radiator (not shown).

The pressure within the intake manifold 22 may be measured using a manifold absolute pressure (MAP) sensor 94. In various implementations, engine vacuum may be measured, where engine vacuum is the difference between ambient air pressure and the pressure within the intake manifold 22. The mass of air flowing into the intake manifold 22 may be measured using a mass air flow (MAF) sensor 96.

The throttle actuator module 28 may monitor the position of the throttle valve 26 using one or more throttle position sensors (TPS) 98. The ambient temperature of air being drawn into the engine control system may be measured using an intake air temperature (IAT) sensor 100. In various implementations, the IAT sensor 100 may be located in a housing with MAF sensor 96. The ECM 16 may use signals from the sensors to make control decisions for the engine control system.

The ECM 16 may communicate with a transmission control module 102 to coordinate shifting gears in a transmission (not shown). For example, the ECM 16 may reduce torque during a gear shift. The ECM 16 may communicate with a hybrid control module 104 to coordinate operation of the engine 12 and an electric motor 106. The electric motor 106 may also function as a generator, and may be used to produce electrical energy for use by vehicle electrical systems and/or for storage in a battery. In various implementations, the ECM 16, the transmission control module 102, and the hybrid control module 104 may be integrated into one or more modules.

To abstractly refer to the various control mechanisms of the engine 12, each system that varies an engine parameter may be referred to as an actuator. For example, the throttle actuator module 28 can change the blade position, and therefore the opening area, of the throttle valve 26. The throttle actuator module 28 can therefore be referred to as an actuator, and the throttle opening area can be referred to as an actuator position.

Similarly, the spark actuator module 40 can be referred to as an actuator, while the corresponding actuator position is amount of spark advance. Other actuators include the boost actuator module 74, the EGR valve 80, the phaser actuator module 68, the fuel injection system 36, and the cylinder actuator module 32. The term actuator position with respect to these actuators may correspond to boost pressure, EGR valve opening, intake and exhaust cam phaser angles, air/fuel ratio, and number of cylinders activated, respectively.

Figure 2:
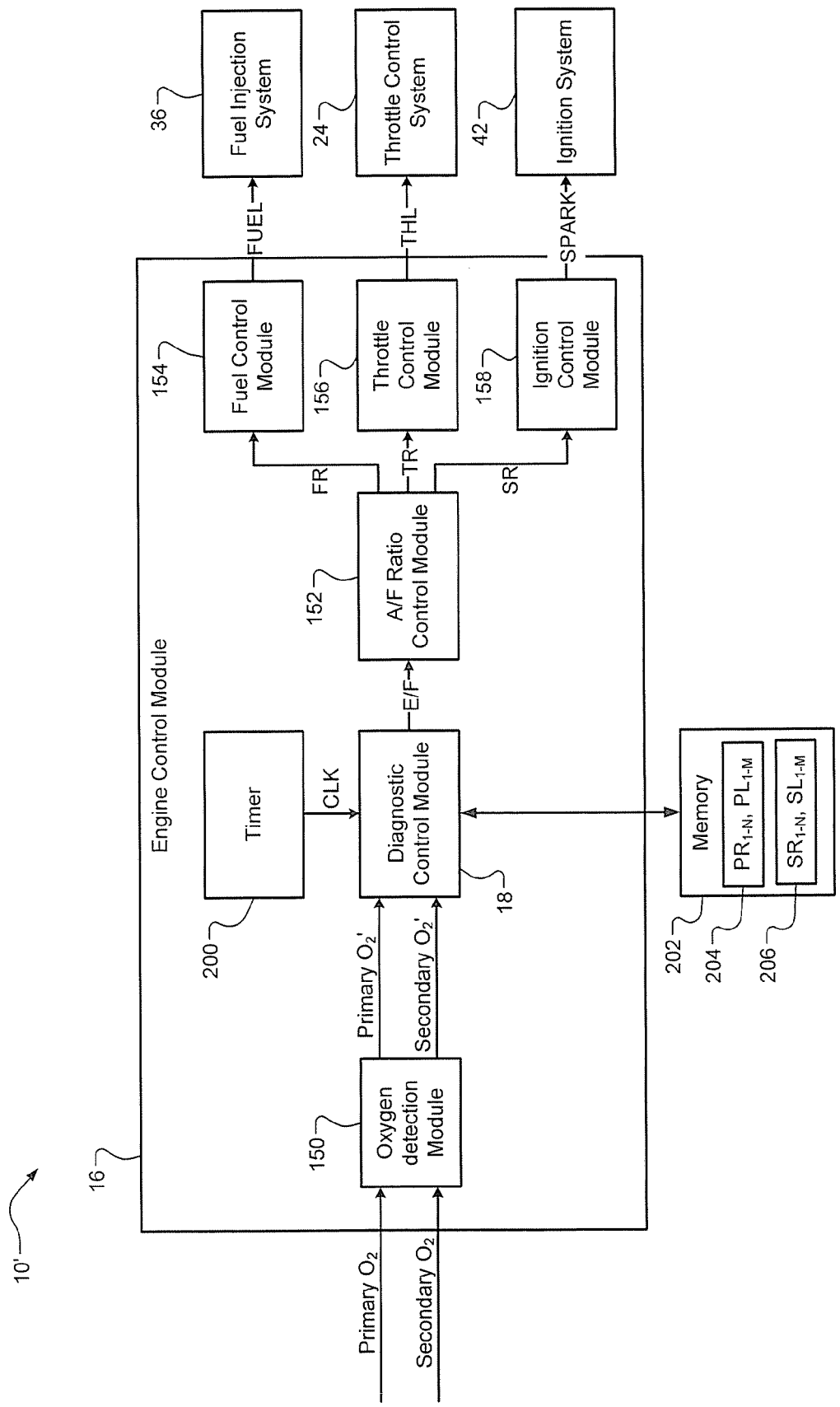
FIG. 2 is a functional block diagram of another portion of the engine control system of FIG. 1 in accordance with an embodiment of the present disclosure.

Referring now also to FIG. 2, a second portion 10' of the engine control system is shown. The second portion 10' includes the ECM 16, the throttle control system 24, the fuel injection system 36, and the ignition system 42. The ECM 16 includes an oxygen detection module 150, the diagnostic control module 18, and an air/fuel ratio control module 152.

In operation, the oxygen detection module 150 receives primary and secondary $O_2$ signals Primary $O_2$ and Secondary $O_2$ from the $O_2$ sensors 52, 54. The oxygen detection module 150 may provide signal conditioning and filter the $O_2$ signals Primary $O_2$ and Secondary $O_2$ to generate conditioned primary and secondary $O_2$ signals Primary $O_2$' and Secondary $O_2$'.

The diagnostic control module 18 generates error and/or fault signals E/F based on the conditioned primary and secondary $O_2$ signals. The air/fuel ratio control module 152 generates a requested fuel signal FR, a requested throttle position signal TR, and a requested spark signal SR. The signals FR, TR and SR are generated based on the error and fault signals E/F and received by respective fuel control, throttle control, and ignition control modules 154, 156, 158. The requested signals are generated to adjust the air/fuel ratio(s) of the engine 12. The air/fuel ratio(s) may be adjusted to be at or centered about predetermined and/or stoichiometric values (e.g. air/fuel ratio 14.7:1).

The fuel control module 154 generates a fuel control signal FUEL based on the requested fuel signal FR. The throttle control module 156 generates a throttle control signal THL based on the requested throttle position signal TR. The ignition control module 158 generates an ignition control signal SPARK based on the requested spark signal SR. The signals FUEL, THL and SPARK may respectively include fuel amounts, injector timing values, injector opening values, injector ON times and durations, throttle positions, spark timing values, etc.

Due to closed loop control of the air/fuel ratio(s), the $O_2$ signals Primary $O_2$ and Secondary $O_2$ may exhibit oscillating characteristics. For example, the primary $O_2$ signal Primary $O_2$ may oscillate between rich and lean states when operating in a normal state (i.e., without errors). An $O_2$ signal may have a sine, square or other periodic and oscillating waveform. A rich state may refer to when an air/fuel ratio is less than a predetermined and/or stoichiometric value (e.g. 14.7:1). A lean state may refer to when an air/fuel ratio is greater than the predetermined and/or stoichiometric value (e.g. 14.7:1).

Figure 3:
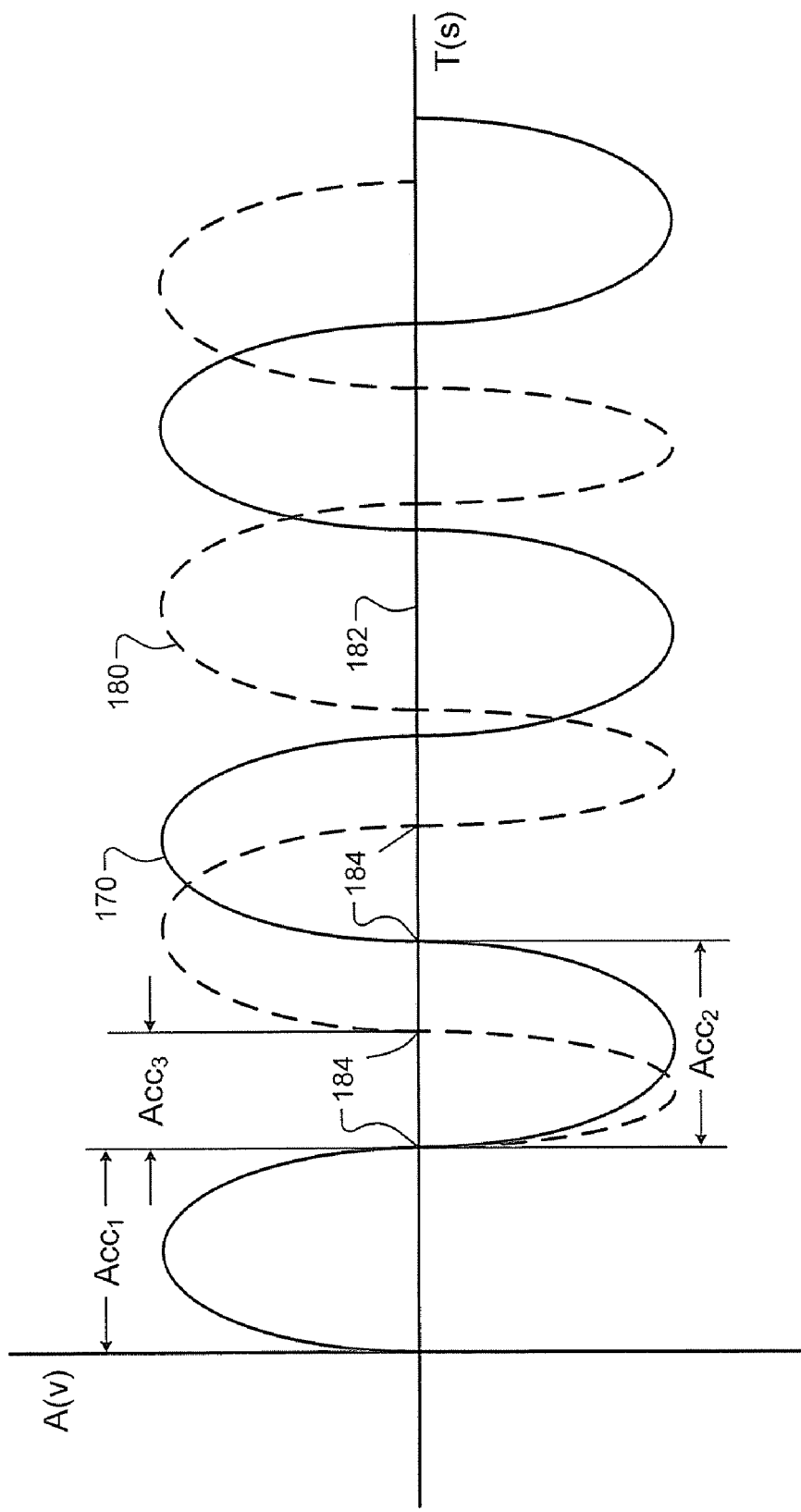
FIG. 3 is an exemplary plot of symmetrical and asymmetrical oxygen signals.

In FIG. 3, an exemplary symmetrical $O_2$ signal 170 and an exemplary asymmetrical $O_2$ signal 180 are shown. The $O_2$ signals 170, 180 may be generated by one of the $O_2$ sensors 52, 54. The symmetrical $O_2$ signal 170 may be associated with an $O_2$ sensor that is operating in a normal or baseline state. The asymmetrical $O_2$ signal 180 may be associated with an $O_2$ sensor that is operating in an error state. An $O_2$ sensor may be operating in a baseline state, for example, when: there are an equal number of rich and lean states provided in a corresponding $O_2$ signal; the duration of the rich states is the same as the duration of the lean states; and frequency of the $O_2$ signal is within a predetermined range. An $O_2$ sensor that has a symmetrical $O_2$ signal may be operating in an error state when the duration of the rich states is not the same as the duration of the lean states; the frequency of the $O_2$ signal exceeds the predetermined range.

The $O_2$ signals 170, 180 have periodic and oscillating profiles that alternate between rich and lean states. Although for the example of FIG. 3, the $O_2$ signals 170, 180 are in a rich state when above a horizontal axis 182 and are in a lean state when below the horizontal axis 182, $O_2$ signals may be offset or shifted up or down relative to the horizontal axis 182. The horizontal axis 182 corresponds to around a midpoint (such as 450 mV) of an output of an $O_2$ sensor. As an example, an $O_2$ sensor may have a 0-900 mV output range, where 0 mV is a leanest value and 900 mV is a richest value. A control target may be about the midpoint with bias. Detection of rich and lean states may be based on when: an $O_2$ signal crosses the horizontal axis 182; the $O_2$ signal exceeds a predetermined level; and/or inflection points of the $O_2$ signal. Example inflection points between rich and lean states are designated 184.

An $O_2$ sensor may operate in a symmetrical state or an asymmetrical state. A symmetrical state refers to when duration of rich state(s) is equal to duration of lean state(s) of an $O_2$ sensor. An asymmetrical state refers to when duration of the rich state(s) is not equal to duration of the lean state(s) of an $O_2$ sensor and/or when a difference between the duration of the rich state(s) and the lean state(s) is greater than a predetermined level or less than another predetermined level. The rich and lean states of an O2 signal may be monitored for one or more cycles of the O2 signal. A cycle includes one rich state and one lean state and three points that are on the horizontal axis or that correspond to a level between rich and lean states. The three points may be inflection points.

The symmetrical $O_2$ signal 170 is of an $O_2$ sensor that is operating in a symmetrical state, as the accumulated time associated with the rich state(s) (e.g., $Acc_1$) is equal to the accumulated time associated with the lean state(s) (e.g. $Acc_2$). The asymmetrical $O_2$ signal 180 is of an $O_2$ sensor that is operating in an asymmetrical state, as the accumulated time associated with the rich state(s) is not equal to the accumulated time associated with the lean state(s) (e.g. $Acc_3$).

An asymmetrical error is associated with an $O_2$ sensor when the $O_2$ sensor is operating in an asymmetrical state. The error may be a rich asymmetrical error or a lean asymmetrical error. A rich asymmetrical error refers to when a ratio between an accumulated time associated with rich state(s) and an accumulated time associated with lean state(s) is less than 1 or a first predetermined ratio. A lean asymmetrical error refers to when a ratio between an accumulated time associated with rich state(s) and an accumulated time associated with lean state(s) is greater than 1 or a second predetermined ratio. A ratio of 1 indicates a pure symmetrical state and/or normal operation. The predetermined ratios are the emission based failure thresholds.

Referring again to FIG. 2, the diagnostic control module 18 may monitor and store durations that the $O_2$ signals Primary $O_2$' and Secondary $O_2$' are in rich and lean states. The durations may be generated based on a time (clock) signal CLK from a timer 200 and stored in memory 202. Rich and lean state durations $PR_{1-N}$ and $PL_{1-M}$ (designated 204) for the pre-converter $O_2$ sensor 52 are shown, where N and M are integers. Rich and lean durations $SR_{1-N}$ and $SL_{1-M}$ (designated 206) for the post-converter $O_2$ sensor 54 are also shown.

Figure 4:
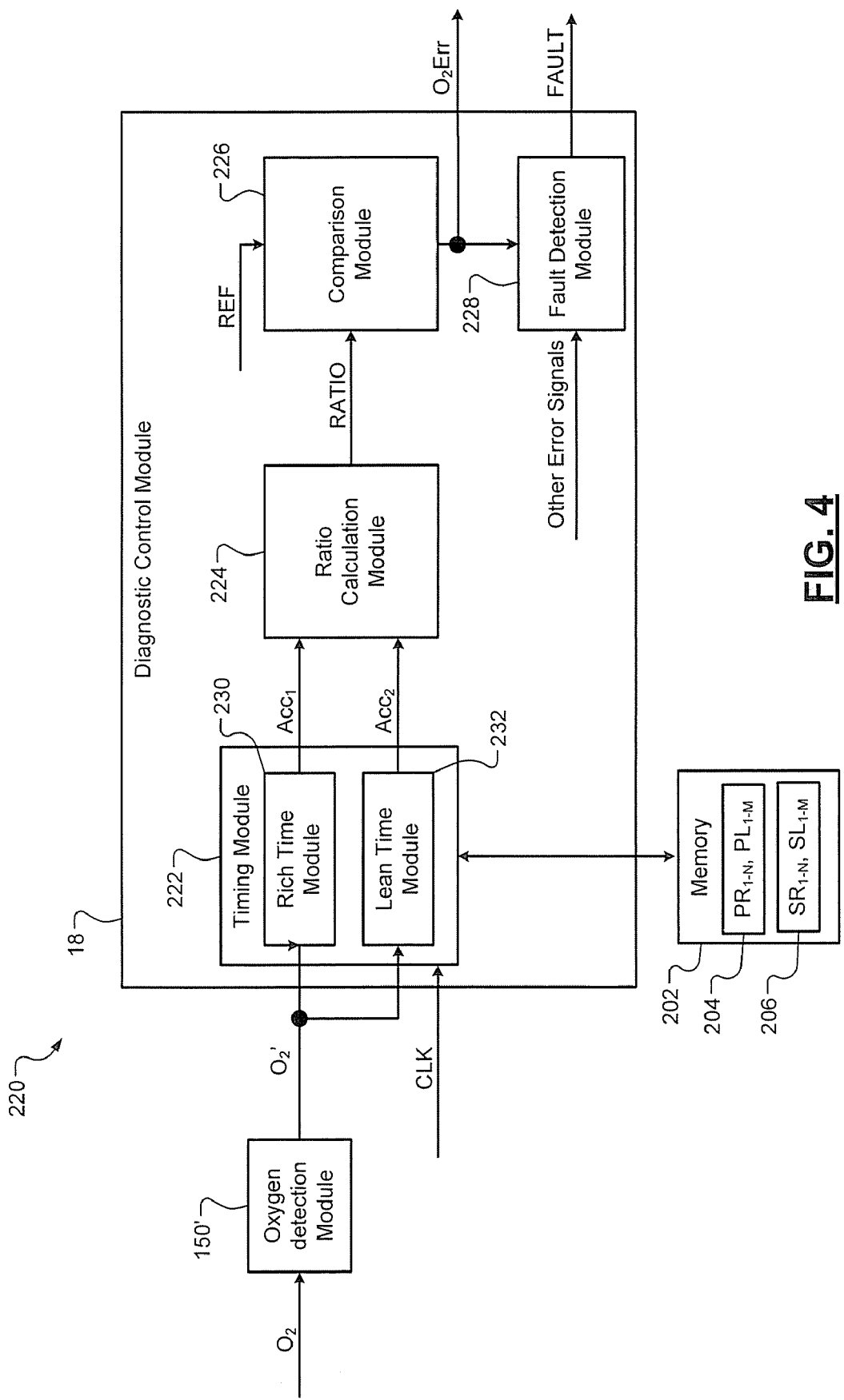
FIG. 4 is a functional block diagram of a diagnostic system in accordance with an embodiment of the present disclosure.

Referring now also to FIG. 4, a diagnostic system 220 is shown. The diagnostic system 220 includes an oxygen detection module 150' and the diagnostic control module 18. The diagnostic control module 18 may include a timing module 222, a ratio calculation module 224, a comparison module 226 and a fault detection module 228. The timing module 222 includes a rich time module 230 and a lean time module 232.

The diagnostic control module 18 may operate in a passive mode and detect error(s) and/or fault(s) associated with one or more $O_2$ sensor(s). The passive mode refers to the detection of error(s) and/or fault(s) without intrusive control of fuel, throttle, and ignition control systems. During the passive mode, the diagnostic control module 18 detects the error(s) and/or fault(s) based on $O_2$ signals generated by the $O_2$ sensor(s). In FIG. 4, a single $O_2$ signal designated $O_2$ is shown for simplicity. The $O_2$ signal may be generated by one of the $O_2$ sensors 52, 54.

Figure 5:
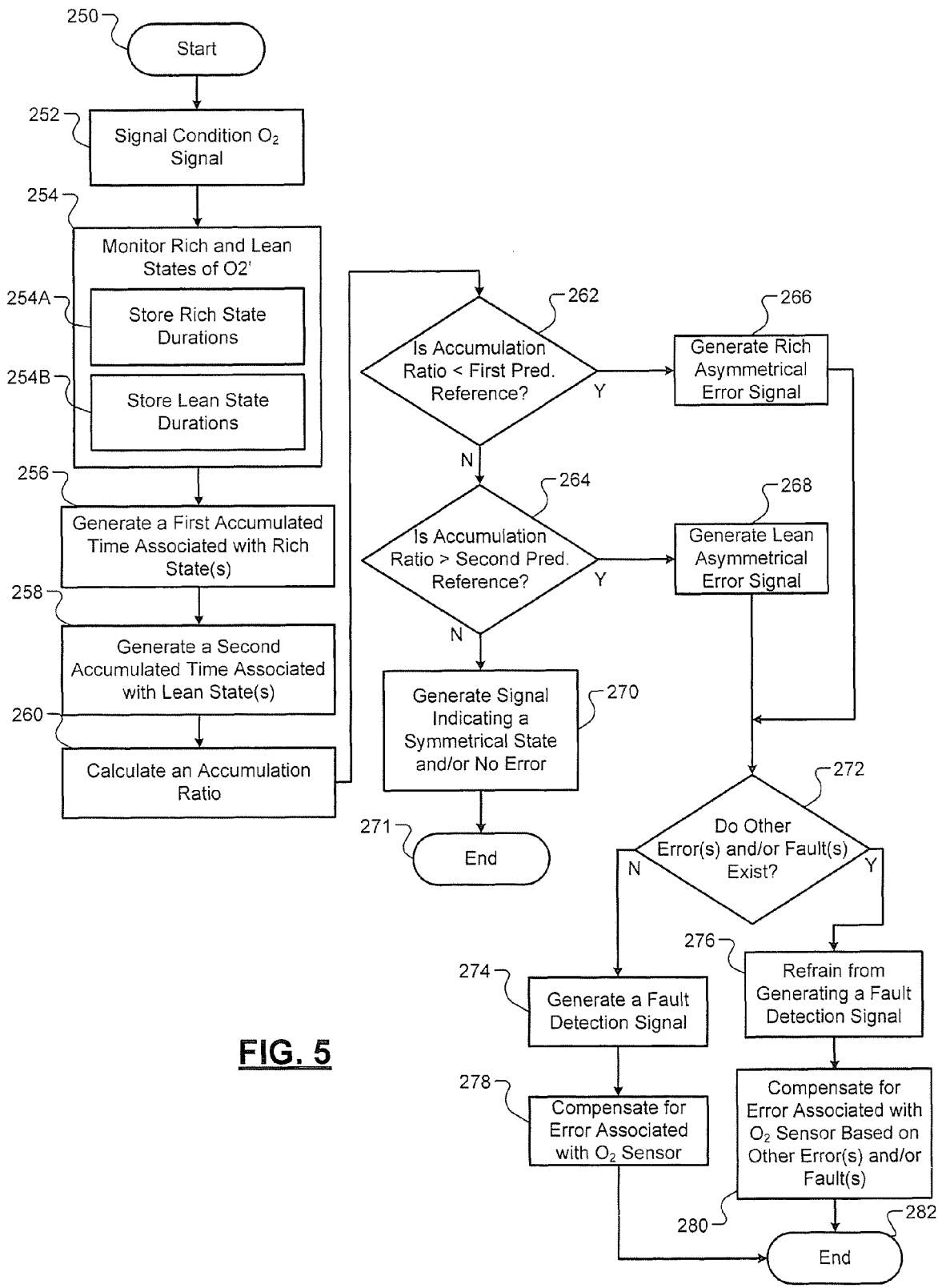
FIG. 5 is a logic flow diagram illustrating a method of operating a diagnostic control system in accordance with an embodiment of the present disclosure.

Referring now also to FIG. 5, a logic flow diagram illustrating a method of operating a diagnostic control system including diagnosing one or more $O_2$ sensors and providing associated compensation is shown. Although the following steps are primarily described with respect to the embodiments of FIGS. 1-3, the steps may be easily modified to apply to other embodiments of the present invention. The method may begin at step 250.

In step 252, the oxygen detection module 150' receives the $O_2$ signal. The oxygen detection module 150' signal conditions the $O_2$ signal to generate a conditioned $O_2$ signal designated $O_2$'. In step 254, the timing module 222 receives and monitors rich and lean states of the conditioned $O_2$ signal. In step 254A, the rich time module 230 monitors rich states of the conditioned $O_2$ signal and stores durations of the rich states in the memory 202 based on the clock signal CLK. In step 254B, the lean time module 232 monitors lean states of the conditioned $O_2$ signal and stores durations of the lean states in the memory 202 based on the clock signal CLK. As an example the N rich state durations $PR_{1-N}$, $SR_{1-N}$ and the M lean state durations $PL_{1-M}$, $SL_{1-M}$ for each of the $O_2$ sensors 52, 54 may be generated by the timing module 222 and stored in the memory 202.

In step 256, the rich time module 230 generates a first accumulated value (e.g. $Acc_1$) based on the stored rich state durations of step 254A. The first accumulated value may be: duration of a single rich state of a single periodic cycle of the conditioned $O_2$ signal; a sum of multiple rich states of the conditioned $O_2$ signal; an average duration of multiple rich states, etc. An accumulated value may refer to a string length of data associated with operating in an air/fuel state (e.g. rich or lean).

In step 258, the lean time module 232 generates a second accumulated value (e.g. $Acc_2$) based on the stored lean state durations of step 254B. The second accumulated value may be: duration of a single lean state of a single periodic cycle of the conditioned $O_2$ signal; a sum of multiple lean states of the conditioned $O_2$ signal; an average duration of multiple lean states, etc. Step 258 may be performed while step 256 is performed.

In step 260, the ratio calculation module 224 calculates an accumulation ratio between the first and second accumulated values and generates a ratio signal RATIO. In steps 262 and 264, the comparison module 226 compares the ratio signal RATIO of step 260 with a predetermined reference REF. In one embodiment, the predetermined reference REF is equal to a rich-to-lean ratio of an $O_2$ sensor operating in a baseline state (e.g. operation of the $O_2$ sensor associated with the $O_2$ signal when the $O_2$ sensor is new). In another embodiment, the predetermined reference REF may be a window boundary around the baseline state.

In step 266, a rich asymmetrical error (or rich side asymmetrical state) is detected when the ratio signal RATIO is less than a first predetermined reference $REF_1$. A rich asymmetrical error may also be detected when the first accumulated signal is less than the second accumulated signal and the difference between the first and second accumulated signals is less than a first predetermined difference. Unless accounted for, a rich asymmetrical error can cause an engine control system to have a rich emission failure. Rich errors are accounted for in steps 278, 280.

In step 268, a lean asymmetrical error (or lean side asymmetrical state) is detected when the ratio signal RATIO is greater than a second predetermined reference $REF_2$. A lean asymmetrical error may also be detected when the first accumulated signal is greater than the second accumulated signal and the difference between the first and second accumulated signals is greater than a second predetermined difference. The second predetermined difference may be equal to the first predetermined difference. Unless accounted for, a lean asymmetrical error can cause an engine control system to have a lean emission failure. Lean asymmetrical errors are accounted for in steps 278, 280.

The comparison module 226 may generate an error signal $O_2$Err when one or more of steps 266 and 268 indicate an error exists. The $O_2$ error signal $O_2$Err may be used to set a corresponding $O_2$ error flag (e.g. diagnostic trouble code) in memory. The $O_2$ error signal $O_2$Err and/or $O_2$ error flag may be associated with and/or identify a particular $O_2$ sensor and corresponding state of that $O_2$ sensor. The $O_2$Err signal may be a rich asymmetrical error signal when generated in step 266 and a lean asymmetrical error signal when generated in step 268.

In step 270, an asymmetrical error is not set when the ratio signal RATIO is in the window defined by the first and second predetermined references $REF_1$, $REF_2$. An asymmetrical error is also not set when a difference between the first and second accumulated signals is between the first predetermined difference and/or the second predetermined difference. A symmetrical state may exist when the ratio signal RATIO is between the predetermine references $REF_1$, $REF_2$ and/or approximately 1. The comparison module 226 may generate the asymmetrical error signal $O_2$Err to indicate that a symmetrical state exists and/or that an asymmetrical error does not exist. Although not shown in FIG. 5, the fault detection module 228 may generate a fault detection signal FAULT that indicates a PASS status of the $O_2$ sensor associated with the asymmetrical error signal $O_2$Err. The method may end at 271 after step 270.

In step 272, the fault detection module 228 determines whether other error(s) and/or fault(s) exist. The fault detection module 228 may, for example, proceed to step 274 when other error(s) and/or fault(s) do not exist, otherwise the fault detection module 228 may proceed to step 276.

In step 274, the fault detection module 228 generates the fault detection signal FAULT based on the $O_2$ asymmetrical error signal $O_2$Err. The fault detection module 228 may generate the fault detection signal FAULT that indicates a FAIL status of the $O_2$ sensor associated with the asymmetrical error signal $O_2$Err. After step 274, step 278 may be performed by, for example, the ECM 16. In step 278, the ECM 16 generates a commanded air/fuel ratio while compensating for the error associated with the $O_2$ asymmetrical error signal $O_2$Err.

In step 276, fault detection module 228 generates the fault detection signal FAULT' based on the $O_2$ asymmetrical error signal $O_2$Err and other error signals and/or fault signals (other set flags or diagnostic trouble codes). Example error signals are stated below. The fault detection signal FAULT may indicate a PASS or a FAIL status of the $O_2$ sensor associated with the asymmetrical error signal $O_2$Err and based on the error(s) and/or fault(s). After step 276, step 280 may be performed by, for example, the ECM 16. In step 280, the ECM 16 generates a commanded air/fuel ratio while compensating for the error associated with the $O_2$ asymmetrical error signal $O_2$Err based on the other error(s) and/or fault(s) determined in step 272.

For example only, the $O_2$ asymmetrical error signal $O_2$Err may be generated based on an $O_2$ signal from the pre-converter $O_2$ sensor 52. The fault detection signal FAULT may be generated for the pre-converter $O_2$ sensor 52 based on the $O_2$ asymmetrical error signal $O_2$Err and/or based on whether an error and/or fault exists with a catalytic converter 50 and the post-converter $O_2$ sensor 54.

As another example, when the catalytic converter 50 has a leak (e.g. an opening to outside air that is external to the catalytic converter 50 and exhaust system 14), the post-converter $O_2$ sensor 54 may indicate that exhaust gas post the catalytic converter 50 is leaner than desired. This may cause the engine control system 10 to operate in a rich state for an increased period of time, which may affect the primary $O_2$ signal Primary $O_2$. As a result, an error may be detected with the pre-converter $O_2$ sensor 52 that is caused by a fault with the catalytic converter 50. The fault detection module 228 refrains from generating a fault detection signal that indicates that the pre-converter $O_2$ sensor 52 is faulty in this situation based on, for example, a diagnostic trouble code that indicates a fault with the catalytic converter 50.

As yet another example, when the post-converter $O_2$ sensor 54 is faulty (e.g. continuously indicating that exhaust gas downstream of the catalytic converter 50 is one of rich and lean), the engine control system 10 may operate in one of a rich state and a lean state for an increased period of time. As a result an error may be detected with the pre-converter $O_2$ sensor 52 that is caused by a fault with the post-converter $O_2$ sensor 54. The fault detection module 228 refrains from generating a fault detection signal that indicates that the pre-converter $O_2$ sensor 52 is faulty in this situation.

Closed loop control of the ECM 16 of FIG. 1 may adjust commanded air/fuel ratio(s) based on and to compensate for the error and/or fault signals generated in the above-described method. For example, when one of the $O_2$ sensors 52, 54 has a fault associated with one of a rich asymmetrical error and a lean asymmetrical error, the ECM 16 may accordingly adjust an amount of fuel supplied to the cylinders of the engine 12. As an example, when the post-converter $O_2$ sensor 54 has a lean asymmetrical error, the ECM 16 without compensation may increase fuel flow. This may result in the pre-converter $O_2$ sensor 52 operating in a rich state longer than in a lean state, which would result in closed loop control of the ECM 16 increasing fuel flow, decreasing air flow, and/or increasing a current air/fuel ratio.

To compensate for these errors, the ECM 16 may prevent an increase in fuel flow and/or decrease fuel flow. As an alternative, the ECM 16 and/or diagnostic control module 18 may adjust information received from the $O_2$ signals to account for the asymmetrical states of the $O_2$ sensors 52, 54. This corrects the asymmetrical states of the $O_2$ sensors 52, 54 and prevents improper operation of closed loop control.

The method may end at 282 after steps 278 and 280. The above-described steps are meant to be illustrative examples; the steps may be performed sequentially, synchronously, simultaneously, continuously, during overlapping time periods or in a different order depending upon the application.

The above-described embodiments may be used to improve fuel flow control, improve engine system performance, and reduce emissions based on the detection of asymmetrical states of $O_2$ sensors and associated compensation. As errors and faults with $O_2$ sensors are accounted for in the above-described embodiments, the above-described embodiments increase operating life of $O_2$ sensors and decrease false diagnostic errors and faults.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for an engine comprising:
    an oxygen detection module that receives an oxygen signal from a first oxygen sensor that detects an oxygen level in an exhaust system of the engine;
    wherein the oxygen signal has N rich states and M lean states, where N and M are integers greater than or equal to 1;

a timing module that determines a rich period that the oxygen signal is in at least one of the N rich states and that determines a lean period that the oxygen signal is in at least one of the M lean states; and a control module that detects an asymmetrical error with the first oxygen sensor based on a comparison between the rich period and the lean period, wherein the control module:
generates an error signal associated with operation of a catalytic converter; and
prevents error detection of the oxygen sensor based on the error signal.

2. The diagnostic system of claim 1, further comprising the oxygen sensor,
wherein the first oxygen sensor is connected to the exhaust system between the engine and the catalytic converter.

3. The diagnostic system of claim 1, wherein the control module generates a ratio based on the rich period and the lean period, and
wherein the control module detects the asymmetrical error based on the ratio.

4. The diagnostic system of claim 3, wherein the control module detects the asymmetrical error when the ratio is greater than or equal to a predetermined ratio.

5. The diagnostic system of claim 3, wherein the control module detects the asymmetrical error when the ratio is not equal to 1.

6. The diagnostic system of claim 3, wherein the control module detects a fault with the first oxygen sensor when the ratio indicates an asymmetrical relationship between the rich period and the lean period.

7. The diagnostic system of claim 3, wherein the control module detects one of a rich failure and a lean failure of the first oxygen sensor based on the ratio.

8. The diagnostic system of claim 1, wherein the rich period is equal to an amount of time that the first oxygen sensor is in one rich state, and
wherein the lean period is equal to an amount of time that the first oxygen sensor is in one lean state.

9. The diagnostic system of claim 1, wherein the timing module determines a first time average based on the N rich states,
wherein the timing module determines a second time average based on the M lean states, and
wherein the control module detects the asymmetrical error based on the first time average and the second time average.

10. A diagnostic system for an engine comprising:
an oxygen detection module that receives an oxygen signal from a first oxygen sensor that detects an oxygen level in an exhaust system of the engine;
wherein the oxygen signal has N rich states and M lean states, where N and M are integers greater than or equal to 1;
a timing module that determines a rich period that the oxygen signal is in at least one of the N rich states and that determines a lean period that the oxygen signal is in at least one of the M lean states; and
a control module that detects an asymmetrical error with the first oxygen sensor based on a comparison between the rich period and the lean period,
wherein the control module:
generates a first error signal associated with at least one of a catalytic converter and a second oxygen sensor;
generates a second error signal associated with the first oxygen sensor; and
detects a fault state with the first oxygen sensor based on the first error signal and the second error signal.

11. The diagnostic system of claim 10, wherein the control module detects the fault state when the first error signal is in a pass state and the second error signal is in a fail state.

12. The diagnostic system of claim 10, wherein the control module detects a non-fault state with the first oxygen sensor when the first error signal is in a fail state and the second error signal is in a pass state.

13. The diagnostic system of claim 1, wherein the oxygen signal is a periodic oscillating waveform that iteratively crosses a predetermined level,
wherein the N rich states are associated with N portions of the periodic oscillating waveform that are one of greater than and less than the predetermined level, and
wherein the M lean states are associated with M portions of the periodic oscillating waveform that are one of greater than and less than the predetermined level.

14. A method of diagnosing an oxygen sensor, the method comprising:
receiving an oxygen signal from a first oxygen sensor that detects an oxygen level in an exhaust system of an engine;
wherein the oxygen signal has N rich states and M lean states, where N and M are integers greater than or equal to 1;
determining a rich period that the oxygen signal is in at least one of the N rich states;
determining a lean period that the oxygen signal is in at least one of the M lean states;
detecting an asymmetrical error with the first oxygen sensor based on a comparison between the rich period and the lean period;
generating a first error signal associated with at least one of a catalytic converter and a second oxygen sensor;
generating a second error signal associated with the first oxygen sensor; and
detecting a fault state with the first oxygen sensor based on the first error signal and the second error signal.

15. The method of claim 14, further comprising generating a ratio based on the rich period and the lean period, and
wherein the control module detects the asymmetrical error based on the ratio.

16. The method of claim 15, further comprising detecting a fault with the first oxygen sensor when the ratio indicates an asymmetrical relationship between the rich period and the lean period.

17. The method of claim 14, wherein the fault state is detected when the first error signal is in a pass state and the second error signal is in a fail state.

18. The method of claim 14, wherein the oxygen signal is a periodic oscillating waveform that iteratively crosses a predetermined level,
wherein the N rich states are associated with N portions of the periodic oscillating waveform that are one of greater than and less than the predetermined level, and
wherein the M lean states are associated with M portions of the periodic oscillating waveform that are one of greater than and less than the predetermined level.

* * * * *